(12) United States Patent
Martin et al.

(10) Patent No.: US 6,491,181 B1
(45) Date of Patent: *Dec. 10, 2002

(54) CENTER OPENING TREATMENT TANK

(75) Inventors: Bradley S. Martin, Wheeling, IL (US); Mark E. Wichmann, Chicago, IL (US); Andrew J. Kajpust, Hanover Park, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/819,027

(22) Filed: Mar. 6, 2000

Related U.S. Application Data (63) Continuation of application No. 09/089,649, filed on Jun. 3, 1998, now Pat. No. 6,032,821.

(51) Int. Cl.[7] .......................... B65D 90/02; B65D 88/00
(52) U.S. Cl. ...................... 220/565; 137/590; 137/592; 220/86.1; 220/495.05; 220/567.3; 220/601
(58) Field of Search ................................ 220/565, 86.1, 220/495.05, 567.3, 601; 137/590, 592

(56) References Cited

U.S. PATENT DOCUMENTS

| | | | |
|---|---|---|---|
| 3,918,605 A | 11/1975 | Butler | |
| 4,659,463 A | 4/1987 | Chandler et al. | |
| 5,162,080 A | 11/1992 | Drager et al. | |
| 5,174,466 A | 12/1992 | Matyja | |
| 5,345,666 A | * | 9/1994 | Matyja .................. 29/451 |
| 5,545,319 A | 8/1996 | Hart et al. | |

FOREIGN PATENT DOCUMENTS

| | | |
|---|---|---|
| DE | 44 22 709 A1 | 6/1994 |
| EP | 0 447 350 A2 | 3/1991 |
| FR | 2 250 938 | 11/1973 |

\* cited by examiner

*Primary Examiner*—Lee Young
*Assistant Examiner*—Joseph C. Merek
(74) *Attorney, Agent, or Firm*—Greer, Burns & Crain, Ltd.

(57) ABSTRACT

A treatment tank for a water conditioning apparatus includes a tank head with a wall with an interior surface and a noncircular rim that defines a first through hole in the wall. A generally cylindrical flange defines a first aperture and has a first nipple portion with a periphery and a noncircular portion radially extending from the periphery of the nipple portion. The noncircular portion is configured to matingly engage the noncircular rim so that contact between the noncircular rim and the noncircular portion prevents rotation of the flange relative to the tank head. A first fastener is engageable on the first nipple portion to secure the flange on the tank head through contact between the fastener and the tank head.

17 Claims, 6 Drawing Sheets

CENTER OPENING TREATMENT TANK

This is a continuation of application Ser. No. 09/089,649, filed Jun. 3, 1998, now U.S. Pat. No. 6,032,821.

BACKGROUND

The present invention relates generally to water treatment tanks of the type used to retain resin beads in a water softener system. More particularly, the present invention includes an improved tank head and flange for simultaneously connecting to a control valve, being the securing point for a tank liner, and retaining a water outlet manifold.

Water treatment tanks are known and used to condition or soften water. The known tanks have a tank head that provides an inlet and an outlet for the water through penetration fittings or collars. The known tanks also have liners to protect the tanks from corrosion and prevent leaching of materials from within the tank. In these conventional tanks, water enters the tank through an inlet, flows to the bottom of the tank while passing through a softening or treatment material, and then enters a manifold near the bottom of the tank to be brought back to the top of the tank, where the treated water exits the tank through an outlet conduit connected to a valve. Examples of such tanks are disclosed in commonly owned U.S. Pat. Nos. 5,174,466 and 5,345,666, which use one central opening with concentric collars and eliminates the need for a gasket.

For the type of conventional tank that uses concentric collars, such as that disclosed in the '466 and '666 patents, an outer collar is welded to the tank head and a nut is tightened to secure an inner collar to the outer collar and the tank head. Since one of the collars must be welded, it is more difficult to disassemble the tank for maintenance. In addition, problems occur when tightening the nut on the inner collar since the inner collar can rotate while rotating the nut.

In other types of known tanks, direct compression gaskets are used but become ineffective due to "compression set" in the gaskets over age. Thus, the tanks of the '466 and '666 patents were designed to eliminate the gasket. To eliminate the gasket, however, required a complex design with a number of separate parts. O-rings replaced a gasket to create a hermetic seal between the concentric collars. Also, in this design, the outer collar must be under compression and the inner collar receives upward pressure to maintain the tight seal.

In center opening type tanks, such as disclosed in the '466 and '666 patents, the opening of the protective liner is attached to an inner surface of an inner collar. This arrangement places the edge of the liner inside the inlet aperture for the tank. In this position, it is extremely difficult and time consuming to weld the liner to the inside of the collar because the position of the liner-collar joint requires cumbersome positioning of the welding tools. The liner also may become susceptible to peeling away from the flange from the force of the incoming water flow.

Also in the center opening type tanks, one large central opening on the tank head provides concentric pathways for the inlet and outlet. A valve connected to the tank head provides corresponding concentric inlet and outlet passages. The inlet passage is donut shaped while an outlet conduit forms the center of the donut shape and connects to the manifold in the tank.

When the control valve is lifted from the tank head for service, the outlet conduit often remains connected to the manifold so that the manifold is pulled out of the tank upon removal of the valve. Due to the density of gravel under-bedding located beneath the resin beads in the tank, it is extremely difficult to push the manifold back into the tank without first emptying the tank, which wastes time and resources.

Finally, other types of tanks have sensor probes or other equipment to test water or solutions sitting in the tank. An example of such a tank is disclosed in commonly owned U.S. Pat. No. 5,699,272. This type of tank requires an opening in the tank head reserved for the probe. For both the probe opening and the main central opening, when cylindrical valve attachment collars are secured to circular tank openings with a nut, the collars are difficult to secure because the collars tend to rotate when rotating the nut.

Thus, a main object of the present invention is to provide an improved center opening tank which is easier to assemble and maintain than presently known tanks.

Yet another object of the present invention is to provide an improved center opening tank with a flange that is not welded to the tank and which cannot rotate upon tightening a nut on a nipple portion of the flange for more efficient assembly of the tank.

Still another object of the present invention is to provide an improved center opening tank with an opening designed for mounting the flange on the internal side of the tank.

Yet another object of the present invention is to provide an improved center opening tank with a domed tank head to provide a stronger tank head.

An additional object of the present invention is to provide an improved center opening tank that retains the liner in a position easier to attach to a flange while away from the apertures in the flange with an improved retaining surface to prevent breaks in the seal between the liner and the flange.

Still a further object of the present invention is to provide an improved center opening tank that retains the manifold in the tank during control valve removal.

SUMMARY OF THE INVENTION

The above-listed objects are met or exceeded by the present center opening water conditioner tank. To provide a tank that is easier to assemble and maintain, the present flange is internally mounted on the tank head and positioned within a noncircular through hole on the tank head to prevent rotation of the flange during tightening by the lock nut. A liner is placed against the interior surface of the tank and has an edge that is secured to a ledge which is positioned for easy and efficient attachment to the liner. In addition, the present invention has a domed tank head and a strainer basket that prevents the manifold from being pulled from the tank during the removal of a water treatment control valve.

More specifically, a treatment tank for a water conditioning apparatus includes a tank head having a wall with an interior surface and a noncircular rim that defines a first through hole in the wall. In addition, the treatment tank also has a generally cylindrical flange that defines a first aperture and has a first nipple portion with a periphery and a noncircular portion radially extending from the periphery of the nipple portion. The noncircular portion is configured to matingly engage the noncircular rim so that contact between the noncircular rim and the noncircular portion prevents rotation of the flange relative to the tank head. A first fastener is also part of the treatment tank and is engageable on the first nipple portion to secure the flange on the tank head through contact between the fastener and the tank head.

In another embodiment, a treatment tank for a water conditioning apparatus includes a tank head, a generally cylindrical flange disposed on the tank head while defining an aperture, a manifold disposed in the tank, and a brace or strainer basket engageable on the manifold and on the flange to secure against the manifold being inadvertently axially withdrawn from the tank.

DESCRIPTION OF THE PREFERRED EMBODIMENT

Figure 1:
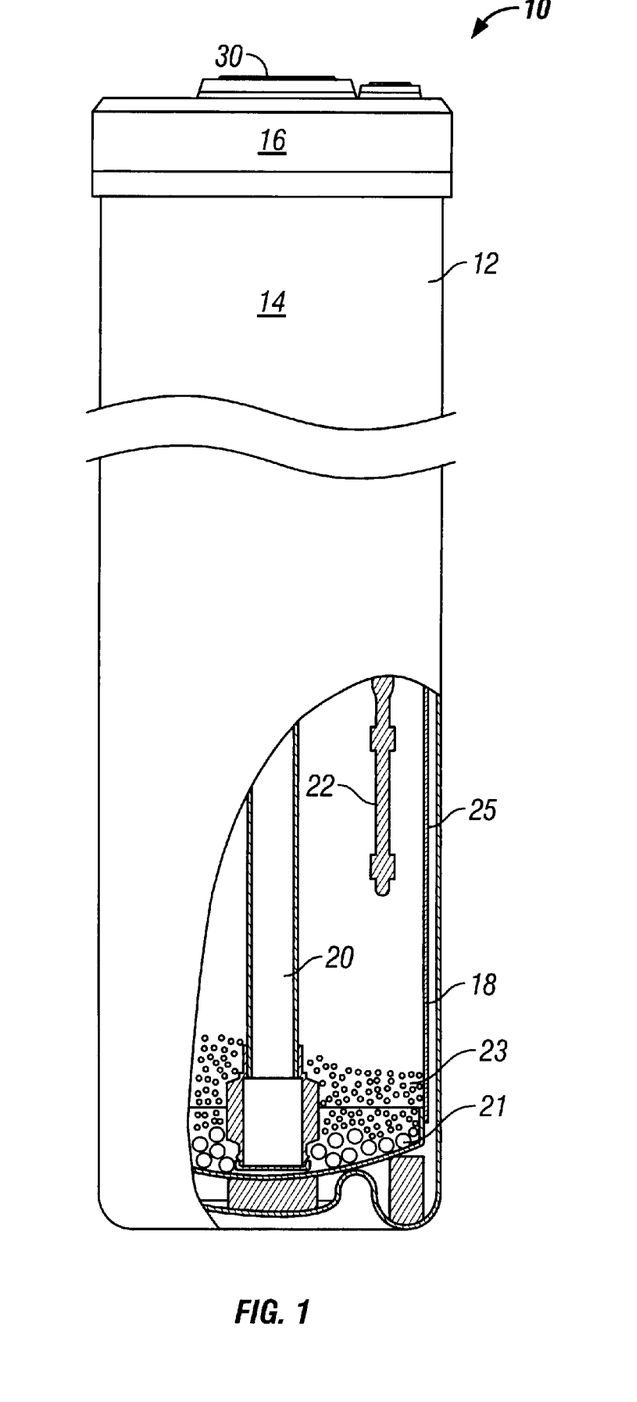
FIG. 1 is a fragmentary side elevation of the exterior of a water softener treatment tank with a partial section through the present tank showing the interior of the lower portion of the present tank.

Referring now to FIG. 1, a water conditioning tank assembly for a water softener is generally designated 10. The tank assembly 10 has a jacket 12 with a body 14 and a cover 16. The body 14 is preferably made from blow molded plastic while the cover 16 is preferably formed from injection molded plastic. Alternative known fabrication or production techniques are contemplated. A preferably steel water treatment tank 18 holds a generally tubular manifold 20 for defining a flow path for the exit of treated water from the tank 18. In the preferred embodiment, a sensor probe 22 is provided for ionically monitoring the condition of a resin bed 23 enclosed in the tank 18. A gravel underbedding 21 is placed beneath the resin bed 23 at the bottom of the tank 18.

Figure 2:
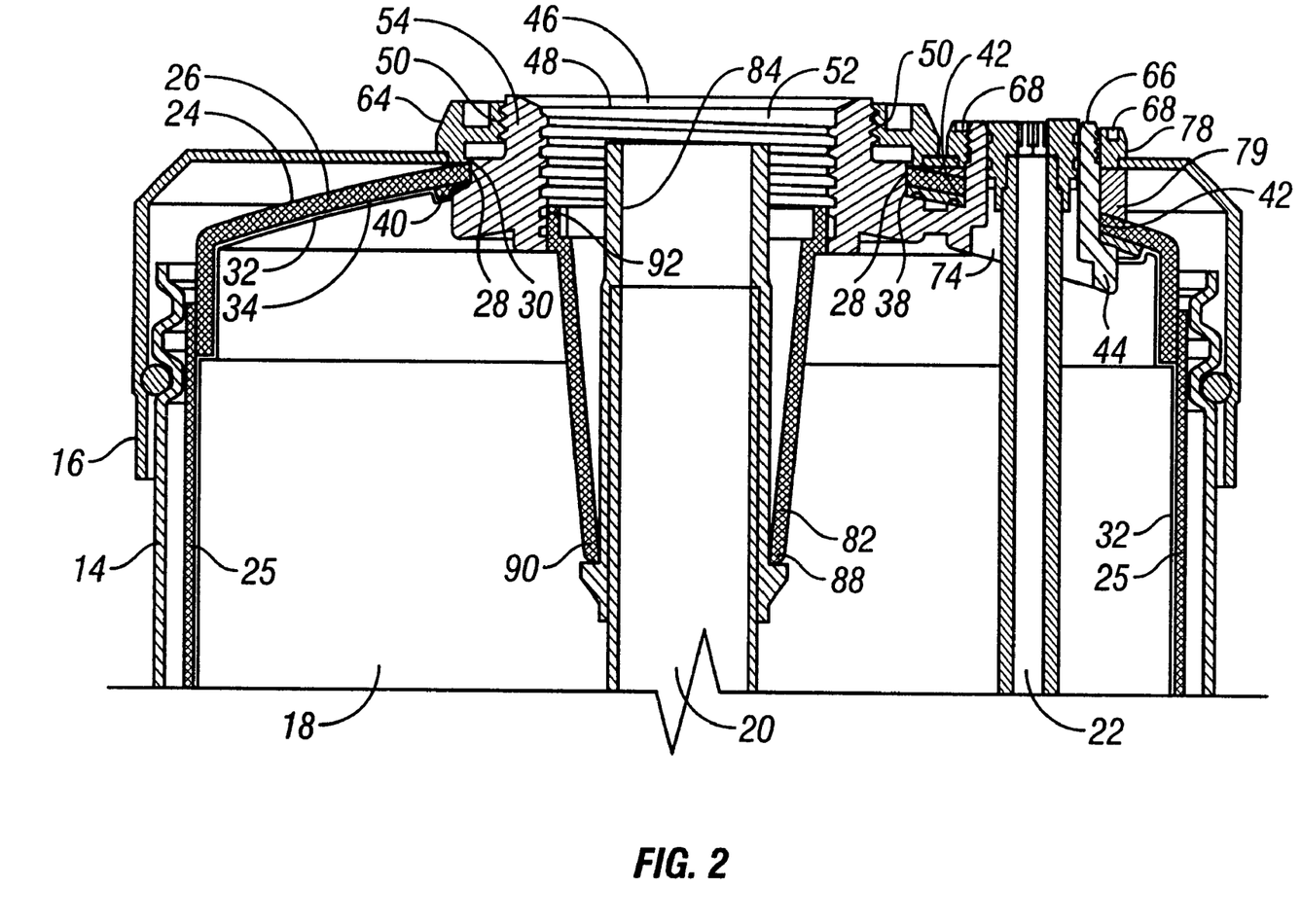
FIG. 2 is a partial vertical section of the assembled top portion of the treatment tank depicted in FIG. 1 and taken along the line 2—2 of FIG. 3 with the addition of the jacket and nuts.
Figure 3:
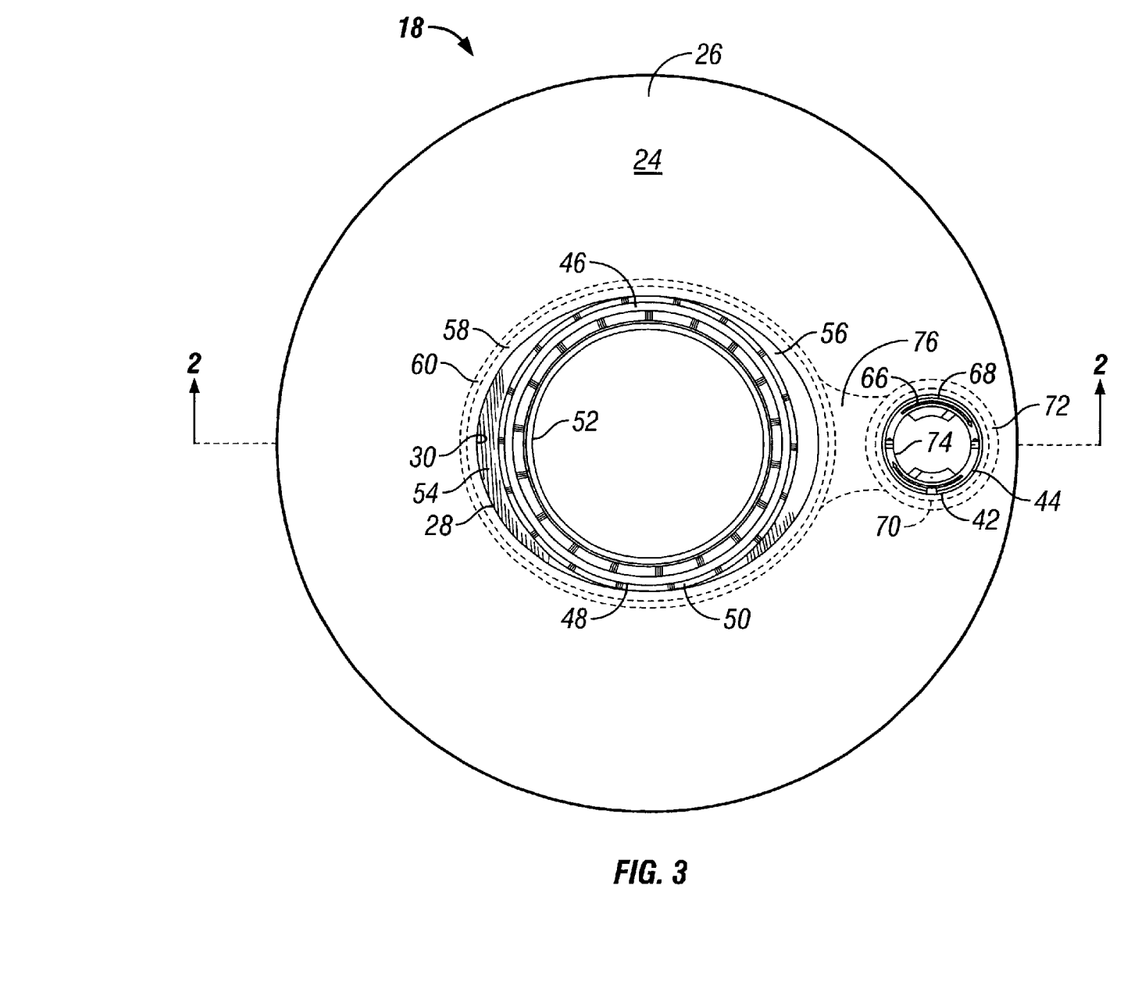
FIG. 3 is a top view of the tank head assembled with the flange used in the present tank.
Figure 5:
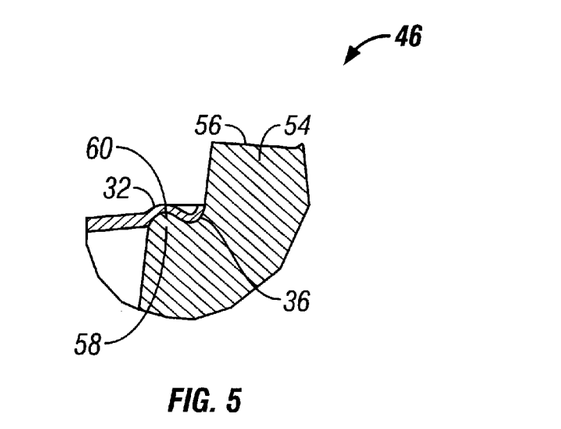
FIG. 5 is an enlarged fragmentary sectional view of the ledge on the flange and the liner in the present tank.

Referring now to FIGS. 2, 3 and 5, included on the tank 18 is a tank head 24 which is sealing secured, as by welding to a cylindrical side wall 25 of the tank 18. The tank head 24 includes a wall 26, which is preferably dome-shaped with a preferred continuous radius of curvature. A first noncircular rim 28 defines a first through hole 30 generally centrally located on the tank head 24. A liner 32 is placed on an interior surface 34 of the wall 26 and the side wall 25, and has an edge 36 (shown on FIG. 5) that defines an opening 38 to the interior of the liner. The liner 32 is preferably made of a sheet of polyvinyl chloride plastic or a similar material. A disk-like flexible gasket 40 extends along the interior surface 34 of the wall 26, between the wall and the liner 32, and conforms to the shape of the tank head. The gasket 40 and liner 32 align with the noncircular rim 28. The gasket 40 further assures a water tight and air tight seal around the through hole 30. An air tight seal is needed because air is used to push the liner tight against the walls 25, 26 of the tank 18. Air leaks will cause the liner 32 to collapse inward in the tank 18.

Also shown in FIG. 2, in the preferred embodiment, the wall 26 has a second rim 42 defining a second through hole 44, also surrounded by the gasket 40 (best seen in FIG. 4), which provides an extra accessway into the tank 18 for accessories such as the ionic probe 22 or other equipment.

Figure 4:
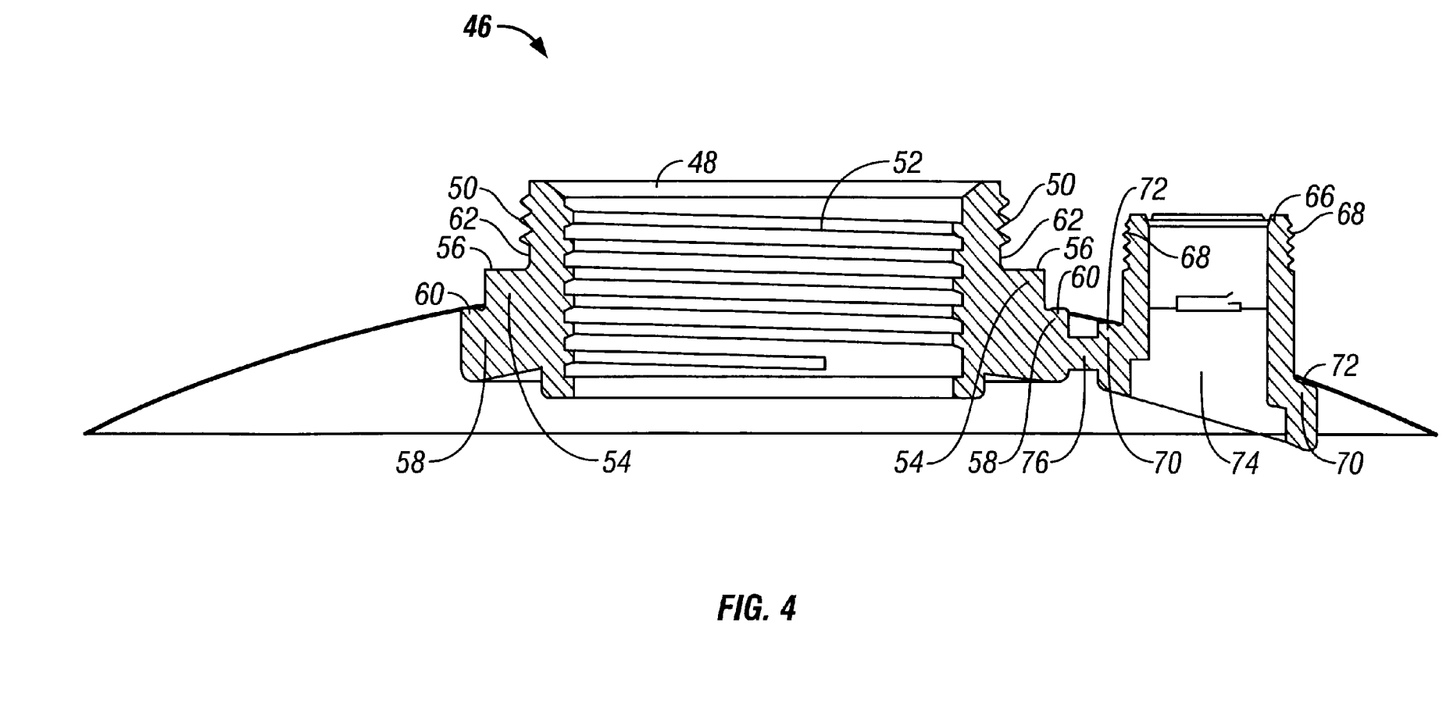
FIG. 4 is a detailed section of the flange shown in FIG. 2.

Referring now to FIGS. 2–4, the tank head 24 is configured to receive a generally cylindrical flange 46 which includes a vertically projecting first nipple portion 48 with a threaded first peripheral edge 50 and defines a threaded first aperture 52. The nipple portion 48 is configured for threaded engagement with a water softener control valve (not shown). A first noncircular portion 54 extends radially from a lower edge of the peripheral edge 50 of the first nipple portion 48 and defines an annular elliptical shoulder surface 56 (best seen in FIG. 3) facing an exterior of the tank 18. As best seen in FIG. 3, the noncircular portion 54 is also preferably elliptical, however other noncircular configurations are contemplated. It will be appreciated that the noncircular portion 54 is dimensioned so that it matingly engages with, and fits snugly within, the noncircular rim 28, which is also preferably elliptical. This snug fit and noncircular shape will prevent rotation of the flange 46 upon engagement with the valve.

In contrast, the first nipple portion 48 and the peripheral edge 50 are preferably circular (also best seen in FIG. 3). The flange 46 and the noncircular rim 28 are dimensioned to enable the placement of the flange through the hole 30 so that the flange can be mounted in the inside of the tank 18 even if the tank head 24 is already secured to the side wall 25.

Referring now to FIGS. 4 and 5, a first ledge 58 has an annular lip 60 and extends radially from a base 62 of the noncircular portion 54. When viewed from the side, the first ledge 58 also has a radius of curvature which generally corresponds to the radius of curvature of the wall 26. The edge 36 of the liner 32 is secured, and preferably RF or radio frequency welded or otherwise sealingly fastened, to the first ledge 58 and to the lip 60. Since the first ledge 58 extends outwardly from the noncircular portion 54, problems with positioning welding tools to attach the liner to the ledge are eliminated. When assembled, the ledge 58 faces the interior surface 34 of the wall 26 so that the opening 38 of the liner 32 is not directly exposed to water flowing into the tank 18 through the first aperture 52. Furthermore, the first ledge 58 and the lip 64 provide a groove for a tighter seal at the edge 36 of the liner 32.

Referring again to FIG. 2, a first fastener 64 is preferably threaded on the peripheral edge 50 of the first nipple portion 48. The first fastener 64 is preferably a threaded nut, and when tightened, contacts the wall 26, near the noncircular rim 28, while essentially pulling the flange 46 against the interior surface 34 of the tank head 24. Tightening the first fastener 64 on the flange 46 squeezes the liner 32 and the gasket 40 between the interior surface 34 of the wall 26 and the first ledge 58. The first fastener 64 also preferably fastens the cover 16 to the wall 26.

Referring now to FIGS. 2–4, the flange 46, in the preferred embodiment, has a vertically projecting second nipple portion 66 similar in structure but smaller in diameter compared to the first nipple portion 48 for matingly engaging with the second through hole 44. Thus, the nipple portion 66 preferably has a threaded periphery 68 and a second ledge 70 extending radially from the second nipple portion 66. A second lip 72 (best seen in FIG. 2) is located on the second ledge 70 for retaining the liner 32. The second nipple portion 66 defines a second aperture 74 for securing the ionic sensor probe 22, which extends from the second aperture 74 and down into the tank 18. In the preferred embodiment, the first and second ledges 58, 70 are integrally formed through a bridge 76 to form the one piece combination flange 46 and nipple portion 66.

Referring now to FIG. 2, a second fastener 78, also preferably a nut, is threaded to the second periphery 80 on the second nipple portion 66 for further support of the flange 46. As with the first fastener 64, the second fastener 78 also bears on the wall 26, although indirectly, and holds the flange 46 in place. Since, as described above, the wall 26 is preferably domed, the second fastener 78, in engaging the second nipple portion 66, will not be parallel to the wall 26 in the vicinity of the second ledge 70. This creates a gap between the second fastener 78 and the wall 26 that varies in height measured around the periphery of the second nipple portion 66. To fill this gap and ensure that the load from the second fastener 78 is transferred to the wall 26, the preferred embodiment includes an annular spacer 79 that varies in height, appearing generally wedge-shaped when viewed from the side, or may include a number of spacers of different heights.

Figure 6:
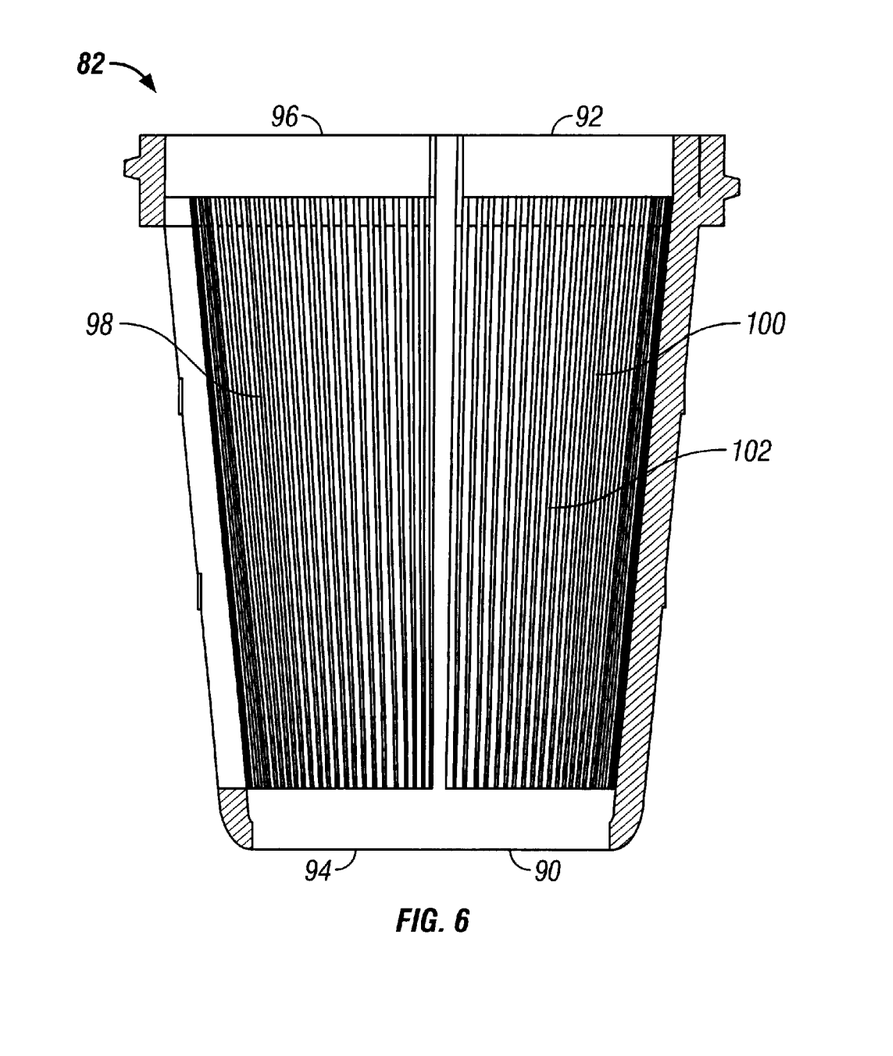
FIG. 6 is vertical sectional view of the strainer used in the present tank.
Figure 7:
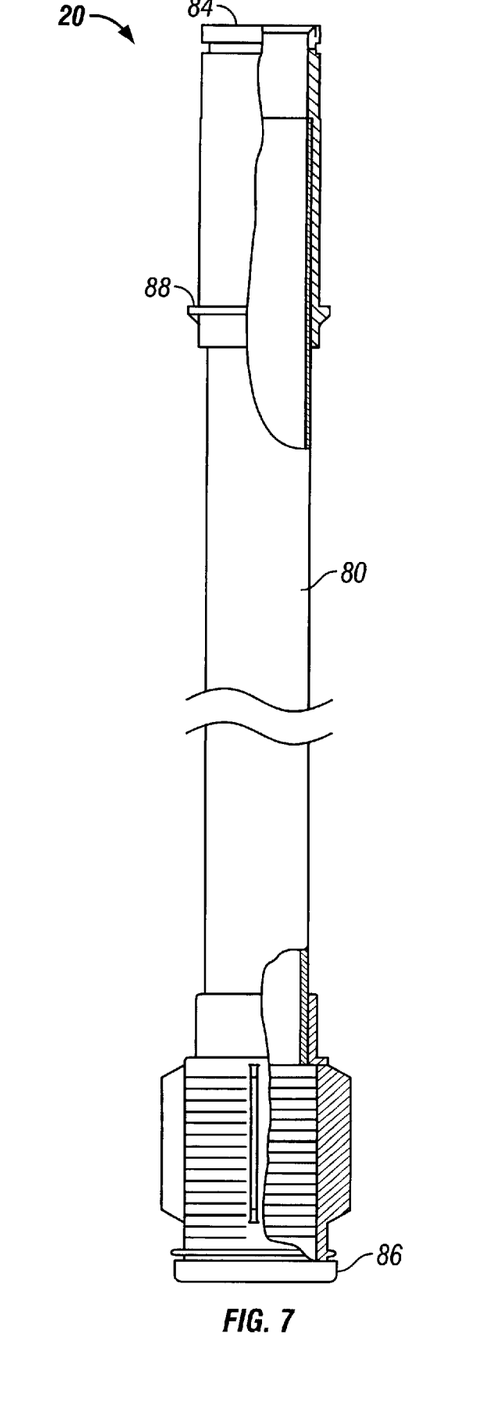
FIG. 7 is a fragmentary elevational view of the manifold used in the present tank with a partial section through the exterior of the manifold to depict the interior of the manifold.

Referring now to FIGS. 2 and 6–7, the manifold 20 has an elongated tubular body 80 connected to a conduit (not shown) in a control valve. A tubular, generally conical strainer basket 82 is positioned to coaxially engage the manifold 20 and to be attached to the flange 46. In the preferred embodiment, the strainer basket 82 and the manifold 20 are by designed to cooperate so that when the control valve is detached from the tank 18 for service, the strainer basket 82 will retain the manifold 20 in the tank by preventing axial movement of the manifold. It will be appreciated that instead of the strainer basket 82, other types of braces are contemplated that will not block the first aperture 52 while retaining the manifold in place.

In the preferred embodiment, the manifold 20 has an upper end 84 that extends freely into the first aperture 52 and connects to the conduit (not shown). A lower end 86 of the manifold 20 extends down into the tank 18 and typically reaches the tank bottom. Near the upper end 84, the manifold 20 has a preferably annular, radially extending lip 88. The strainer basket 82 has a lower end 90 that engages the lip 88 when the tank 10 is assembled. In addition, the strainer basket 82 also has an upper end 92 that is preferably threadably engaged into the first aperture 52.

To connect the manifold 20 to the flange 46, the lower end 90 of the strainer basket 82 forms a first opening 94 dimensioned to slidingly engage the manifold, and the upper end 92 forms a second opening 96 which is larger than the first opening. To assemble the tank 10, the strainer basket 82 is inserted upon the manifold 20 and falls downward until the lower end 90 engages the lip 88. In this manner, the manifold 20 is prevented from axial movement by the strainer basket 82, which is secured to the flange 46.

The strainer basket 82 preferably has a tubular conical wall 98 made of a number of slits 100 divided by fins 102 that are preferably generally parallel to the axial direction of the manifold 20 when the strainer basket is on the manifold.

In operation, the water flows into the flange 46 from the conduit on a control valve (not shown) attached to the top of the first nipple portion 48. The water flows between the first aperture 52 and the manifold 20, through the strainer basket 82 and passes through the resin bed 23. Treated water that flows to the bottom of the tank 18 then enters the lower end 86 of the manifold 20. The treated water flows to the upper end 84 and through the manifold 20. Then, flowing back out the first aperture 52, the treated water flows through the conduit, preferably, for use in water fixtures.

It will be appreciated that the improved treatment tank of the present invention has a number of features for easier maintenance, and which result in greater operational efficiency. The tank head's noncircular rim 28 and the flange 46 provide for internal mounting of the flange on the tank head and prevent rotation of the flange upon securing the flange to the tank head. In addition, flange 46 and liner 32 are configured to provide for easy attachment of the liner to the flange. Another feature is that the liner 32 is attached to the flange 46 in a way which provides a water and air tight seal while protecting the attachment point from the flow of incoming untreated water. Furthermore, a second part of the flange 46 and a second part of the tank head 24 provide the same advantages listed above while providing access for a sensor probe 22 and additional support for the flange 46. A dome shape design is used to strengthen the tank head 24. Finally, a strainer basket or brace 82 is used to retain the manifold 20 in the tank 18 when a control valve is lifted from the tank head 24 for service.

While a particular embodiment of the improved center opening treatment tank of the present invention has been shown and described, it will be appreciated by those skilled in the art that changes and modifications may be made thereto without departing from the invention in its broader aspects and as set forth in the following claims.

What is claimed is:

1. A treatment tank for a water conditioning apparatus, comprising a sidewall:

a tank head secured to said sidewall and having a wall with an interior surface and a noncircular rim defining a first through hole in said wall;

a generally cylindrical flange defining a first aperture and having a first nipple portion with a periphery and a noncircular portion radially extending from said periphery of said nipple portion, configured to matingly engage said noncircular rim so that contact between said noncircular rim and said noncircular portion peripheral wall prevents rotation of said flange relative to said tank head;

a first fastener engageable on said first nipple portion to secure said flange on said tank head through contact between said fastener and said tank head; and said wall further includes a second rim defining a second through hole, and said flange further includes a second nipple portion defining a second aperture, and having a second ledge radially extending from said second nipple portion and attached to said first ledge.

2. The tank according to claim 1, wherein said wall is dome shaped and has a continuous radius of curvature.

3. The tank according to claim 2, wherein said flange further includes a first ledge radially extending from a base of said noncircular portion, facing said interior surface and having a radius of curvature which generally corresponds to said radius of curvature of said wall.

4. The tank according to claim 1, wherein said noncircular rim of said wall and said noncircular portion are both elliptical.

5. The tank according to claim 1, further comprising a liner disposed against said interior surface of said wall and having an edge defining an opening, and said flange further includes a first ledge radially extending from a base of said noncircular portion and facing said interior surface, said edge being secured to said flange at said first ledge.

6. The tank according to claim 5, further comprising a gasket disposed between said interior surface and said liner at said ledge.

7. The tank according to claim 5, wherein said first ledge of said flange further includes a lip configured for attachment to said edge.

8. The tank according to claim 7, wherein said liner is welded to said lip.

9. The tank according to claim 1, flier including a second fastener engageable on said second nipple portion to further secure said flange on said tank head.

10. The tank according to claim 1, further comprising:
   a sensor probe secured in said second aperture and configured to extend into said tank.

11. The tank according to claim 1, wherein said first ledge is integrally formed with said second ledge.

12. The tank according to claim 1, wherein said wall is dome shaped and disposed so that said second fastener generally defines a plane nonparallel to said wall near said second nipple portion, and the tank further comprises at least one spacer placed between said second fastener and said wall at said second ledge.

13. A treatment tank for a water conditioning apparatus, comprising:
   a tank head;
   a generally cylindrical flange disposed on said tank head and defining an aperture;
   a manifold disposed in the tank;
   a brace engageable on said manifold and on said flange to secure against said manifold being axially withdrawn from the tank, said brace being configured and disposed for permitting water to bypass said manifold and access into or out of said tank from an area between said flange and said manifold within said aperture;
   said manifold further including an elongated tubular body having an upper end configured to attach to a conduit extending to an exterior of the tank, said conduit being accessible through said aperture, a lower end extending into the tank, and a generally radially extending lip; and
   said brace further includes a lower end engaging said lip and an upper end secured to said flange in said aperture.

14. The tank according to claim 13, wherein said brace is a strainer basket configured so that said lower end defines a first opening and said upper end defines a second opening larger than said first opening and disposed so that said manifold fits through said first and second openings.

15. The tank according to claim 14, wherein said strainer basket further includes a conical wall with a plurality of elongated slits defined by a plurality of fins disposed generally parallel to said manifold.

16. The tank according to claim 13, wherein an upper end of said brace is threadably engaged with an interior face defining said aperture.

17. The tank according to claim 13, wherein said tank head further includes a noncircular rim defining a first through hole in said tank head;
   said flange further defines an aperture and includes a nipple portion with a periphery and a noncircular portion radially extending from said periphery of said nipple portion and is configured to matingly engage said noncircular rim so that contact between said noncircular rim and said noncircular portion prevents rotation of said flange relative to said tank head; and
   the tank further comprises a fastener engageable on said nipple portion to secure said flange on said tank head through contact between said fastener and said tank head.

* * * * *